US009807574B2

(12) United States Patent
Navalekar et al.

(10) Patent No.: US 9,807,574 B2
(45) Date of Patent: Oct. 31, 2017

(54) MULTICAST AND BROADCAST SERVICES OVER A MESH NETWORK

(71) Applicant: Parallel Wireless, Inc., Nashua, NH (US)

(72) Inventors: Abhijit Navalekar, Westford, MA (US); Rajesh Kumar Mishra, Westford, MA (US); Kaitki Agarwal, Westford, MA (US); Prashanth Rao, Wilmington, MA (US)

(73) Assignee: Parallel Wireless, Inc., Nashua, NH (US)

( * ) Notice: Subject to any disclaimer, the term of this patent is extended or adjusted under 35 U.S.C. 154(b) by 106 days.

(21) Appl. No.: 14/506,587

(22) Filed: Oct. 3, 2014

(65) Prior Publication Data

US 2015/0098385 A1 Apr. 9, 2015

Related U.S. Application Data

(60) Provisional application No. 61/886,441, filed on Oct. 3, 2013.

(51) Int. Cl.
*H04W 4/06* (2009.01)
*H04L 1/00* (2006.01)
(Continued)

(52) U.S. Cl.
CPC ............... *H04W 4/06* (2013.01); *H04L 1/00* (2013.01); *H04L 12/189* (2013.01);
(Continued)

(58) Field of Classification Search
None
See application file for complete search history.

(56) References Cited

U.S. PATENT DOCUMENTS

2002/0077151 A1 6/2002 Matthews et al.
2005/0074019 A1 4/2005 Handforth et al.
(Continued)

FOREIGN PATENT DOCUMENTS

EP 2237612 A1 10/2010
WO 2011092698 A1 8/2011

OTHER PUBLICATIONS

"LTE eMBMS Technology Overview," Qualcomm Research Presentation, research.qualcomm.com, Nov. 2012, pp. 1-18.
(Continued)

*Primary Examiner* — Peter Chau
(74) *Attorney, Agent, or Firm* — Michael Y. Saji

(57) ABSTRACT

A system is disclosed for providing multicast services to mobile devices, comprising a first network node providing a radio access network to a mobile device; a second network node coupled to the first network node and providing backhaul routing for the first network node; a controller node, coupled to both the first and the second network node and to a multicast packet gateway, wherein the controller node provides a virtualized interface of a single network node to the multicast packet gateway, thereby virtualizing the first and second network nodes to the multicast packet gateway such that the multicast packet gateway may be enabled to send a multicast data stream to the first and the second network nodes via the controller node.

11 Claims, 6 Drawing Sheets

(51) Int. Cl.
*H04W 40/00* (2009.01)
*H04L 12/18* (2006.01)
*H04W 88/16* (2009.01)
*H04W 28/06* (2009.01)
*H04W 40/12* (2009.01)

(52) U.S. Cl.
CPC ........... *H04W 40/00* (2013.01); *H04L 12/185* (2013.01); *H04W 28/06* (2013.01); *H04W 40/12* (2013.01); *H04W 88/16* (2013.01)

(56) References Cited

U.S. PATENT DOCUMENTS

| | | | |
|---|---|---|---|
| 2005/0153725 A1 | 7/2005 | Naghian et al. | |
| 2008/0304485 A1* | 12/2008 | Sinha | H04L 12/66 370/392 |
| 2009/0111456 A1 | 4/2009 | Shaffer et al. | |
| 2010/0265867 A1* | 10/2010 | Becker | H04W 72/005 370/312 |
| 2011/0154421 A1* | 6/2011 | Chun | H04N 21/2385 725/109 |
| 2012/0008525 A1* | 1/2012 | Koskinen | H04W 28/22 370/253 |
| 2012/0039299 A1* | 2/2012 | Teyeb | H04B 7/2606 370/331 |
| 2012/0058765 A1 | 3/2012 | Choi | |
| 2013/0079018 A1* | 3/2013 | Teyeb | H04W 36/32 455/441 |
| 2013/0163412 A1* | 6/2013 | Hughes | H04W 40/04 370/228 |
| 2013/0182631 A1* | 7/2013 | Jamadagni | H04B 7/15592 370/312 |
| 2013/0237230 A1* | 9/2013 | Raaf | H04L 41/0813 455/436 |
| 2013/0250900 A1* | 9/2013 | Gora | H04W 72/08 370/329 |
| 2013/0294326 A1* | 11/2013 | Jiao | H04W 76/022 370/312 |
| 2014/0024306 A1* | 1/2014 | Redana | H04B 7/2606 455/7 |
| 2015/0011158 A1* | 1/2015 | Luo | H04W 16/26 455/11.1 |
| 2015/0189543 A1* | 7/2015 | Stassen | H04L 65/80 370/230 |

OTHER PUBLICATIONS

Sung-Hwa Lim, Cheolgi Kim, Young-Bae Ko and Nitin H. Viadya, An Efficient Multicasting for Multi-Channel Multi-Interface Wireless Mesh Networks, IEEE MILCOM Oct. 2009, pp. 1-7.

"Expway's BM-SC: Leverage the Power of Broadcast to Push Files & Deliver Live TV," Webpage, http://www.expway.com/products/embms/,retrieved Sep. 30, 2014, pp. 1-4.

Wim Brouwer, "eMBMS," presentation, May 2013, pp. 1-26, http://www.scribd.com/doc/178369827/eMBMS.

"Motorola's MBMS Solutions: An End-to-End Perspective," White Paper, 2007, pp. 1-15, http://www.motorola.com/mcne/TechDocs/MBMS.pdf.

* cited by examiner

MULTICAST AND BROADCAST SERVICES OVER A MESH NETWORK

CROSS-REFERENCE TO RELATED APPLICATIONS

This application claims the benefit of priority under 35 U.S.C. §119(e) of U.S. Provisional Patent Application No. 61/886,441, filed Oct. 3, 2013, entitled "MBMS Services Over an LTE Mesh Network," which is hereby incorporated by reference in its entirety. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; and U.S. patent application Ser. No. 14/211,355, entitled "Methods of Incorporating an Ad Hoc Cellular Network into a Fixed Cellular Network," filed Feb. 18, 2014.

BACKGROUND

Recently, mobile phone networks have begun to take advantage of newer protocols and technologies developed on Internet Protocol (IP). The Long Term Evolution (LTE) protocol, which specifies both a core network architecture and an air interface for mobile devices, leverages an all-IP architecture to provide both data and voice. In the LTE architecture, wireless base stations, known as eNodeBs, provide access to mobile devices, known as user equipments (UEs), and utilize backhaul connections to a telecommunications operator's core network, which are typically wired connections.

Mobile operators have also sought to provide broadcast technologies to users, such as live television broadcasts directly to mobile devices. In the past, radio frequency broadcasts of television were received directly by many user terminals. However, the use of an all-IP network involves encapsulating data into packets, each of which has a destination, thus providing a point-to-point network instead of a broadcast network. Providing broadcast, multicast, and point-to-multipoint features on an IP network, therefore, is challenging. The LTE standard includes a standard for providing broadcast and multicast over IP, known as evolved multimedia broadcast multicast services (eMBMS). This standard is provided in 3GPP technical standards (TS) 22.146, 22.246, 23.246, 25.346, 25.992, 26.346, 36.300, 36.440, 43.246, and others. Each of the above standards documents are hereby incorporated herein in their entirety.

In a related technology field, it has recently become possible to provide 3G and 4G cellular connectivity via mesh networks, in which each node of the network provides routing capabilities for the network. Mesh networks provide greater resiliency, shorter setup time, and greater flexibility. However, since the routes used for delivering packets to each node are dependent on transient links between mesh nodes providing broadcast, multicast, and point-to-multipoint features on an IP-based mesh network entails additional challenges.

SUMMARY

Systems and methods are disclosed herein for providing multicast services to mobile devices. Specifically, in one embodiment, a system is disclosed, comprising: a first network node providing a radio access network to a mobile device; a second network node coupled to the first network node and providing backhaul routing for the first network node; a controller node, coupled to both the first and the second network node and to a multicast packet gateway, wherein the controller node provides a virtualized interface of a single network node to the multicast packet gateway, thereby virtualizing the first and second network nodes to the multicast packet gateway such that the multicast packet gateway may be enabled to send a multicast data stream to the first and the second network nodes via the controller node.

The controller node may be configured to receive link quality indication messages from the first and the second network nodes. The controller node may be configured to construct a multicast route at the controller node based on the link quality indication messages. The controller node may be configured to send the multicast route to the first and the second network nodes. The controller node may be configured to select a radio resource to be shared by the first and the second network nodes. The system may further comprise a plurality of mesh network nodes, wherein the first and the second network nodes may be mesh network nodes. The controller node performs radio resource control for enabling the first and the second network nodes to form a single frequency network. The controller node performs the functions of at least one of a broadcast multicast service center (BM-SC) and a multicast coordination entity (MCE), according to the evolved multimedia broadcast multicast services (eMBMS) standard. The first and the second network nodes may be coupled to each other via an intermediate mesh network node, and wherein the intermediate mesh network node may be intermittently coupled to either the first or the second network nodes. The first and the second network nodes may be eNodeBs.

In some embodiments, a method is disclosed for providing multicast services to mobile devices, comprising: providing, at a controller node, an interface representing a single network node to a multicast server node; receiving, at the controller node, link status messages from a first and a second network node; constructing, at the controller node, a multicast route at the controller node based on the received link status messages; receiving, at the controller node, a multicast data stream from the multicast server node; and sending the multicast data stream to at least two mobile devices via the constructed multicast route.

The method may further comprise determining if either the first or the second network node should be placed on a reserve list. The method may further comprise buffering the multicast data stream at an anchor node, the anchor node being either the first or the second network node. The first and the second network nodes may be base stations in a radio access network. The method may further comprise performing radio resource control for the first and the second network nodes to cause the first and the second network nodes to create a single frequency network domain.

In some embodiments, a multicast network control node is also disclosed, comprising: a controller node, coupled to both a first and a second radio access base station and to a multicast packet gateway, wherein the controller node provides a virtualized interface of a single network node to the multicast packet gateway, thereby virtualizing the first and second radio access base stations to the multicast packet gateway such that the multicast packet gateway may be enabled to send a multicast data stream to the first and the second radio access base stations via the controller node.

In some embodiments, a non-transient computer-readable medium is also disclosed, comprising code that, when executed, performs functions comprising: providing, at a controller node, an interface representing a single network node to a multicast server node; receiving, at the controller node, link status messages from a first and a second network node; constructing, at the controller node, a multicast route at the controller node based on the received link status messages; receiving, at the controller node, a multicast data stream from the multicast server node; and sending the multicast data stream to at least two mobile devices via the constructed multicast route.

DETAILED DESCRIPTION

The LTE Protocol

Figure 1:
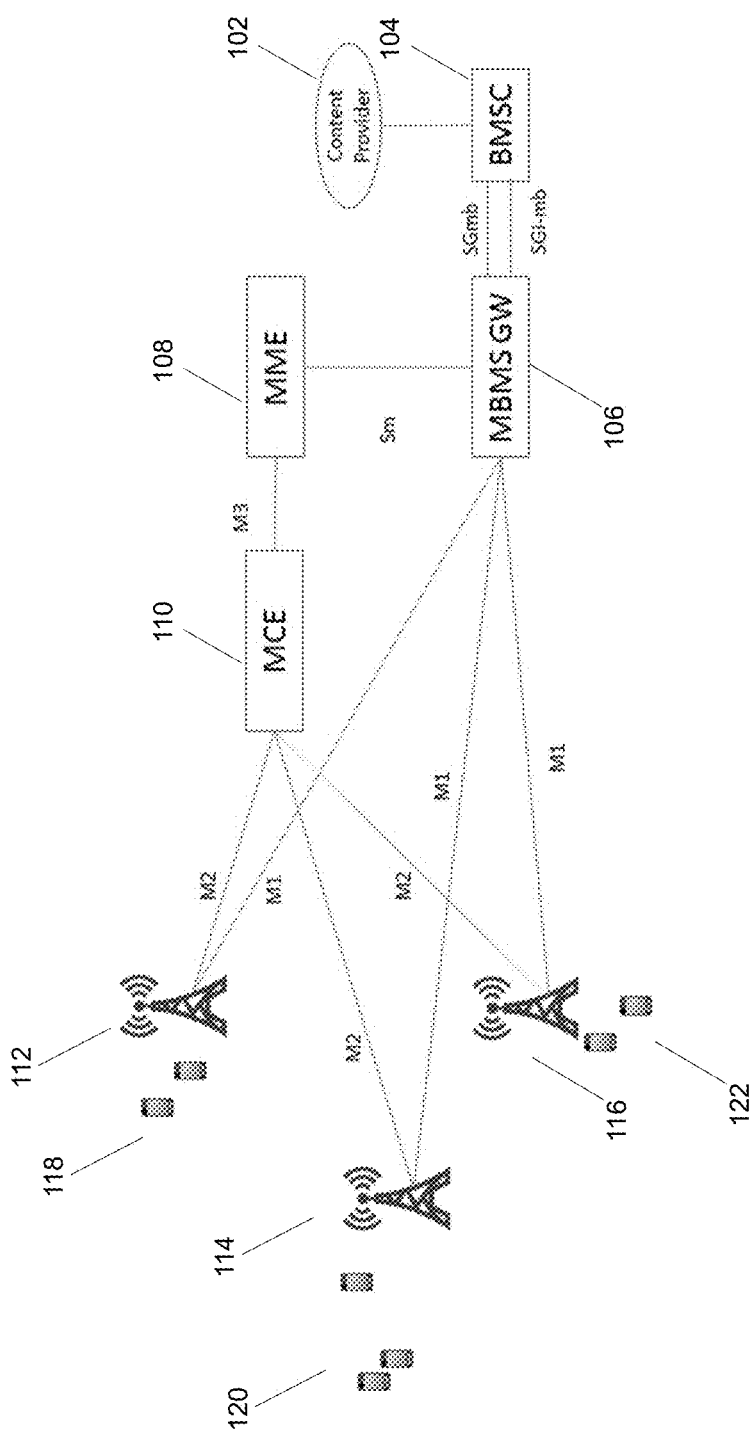
FIG. 1 is a schematic diagram of a network providing MBMS services.

A brief overview of the Long Term Evolution (LTE) standard follows. In the LTE standard, a network includes a radio access network (RAN) portion and a core network portion. The radio access network portion includes base stations (or access points), known as eNodeBs (eNBs), which are responsible for connecting via radio transceivers to user mobile devices, known as user equipments (UEs). Generally, eNodeBs communicate with a mobility management entity (MME) on the control plane using the S1-AP protocol, and with a serving gateway (SGW) on the data plane. eNodeBs may also communicate with other eNodeBs using the X2-AP protocol.

The eNodeBs provide access to UEs by communicating the current location of the UE to the MME at the time the UE attaches. Subsequently, all unicast IP data directed to the UE will be forwarded by the MME to the appropriate SGW and eNodeB, and the serving eNodeB that the UE is attached to will forward packets as appropriate to and from the UE. eNodeBs are capable of using the evolved UMTS terrestrial radio access network (EUTRAN) protocol, which is also referred to as an air interface. UMTS refers to the Universal Mobile Telecommunications System, used for 3G communications.

The core network includes a number of additional network nodes, known as the evolved packet core (EPC) or the system architecture evolution (SAE) core. The core network is a flat, all-IP architecture split into a control plane and a user plane, wherein the control plane is used for control messages among nodes in the network, and the user plane is used for transferring user data. As described above, the core network may include a mobility management entity (MME), a serving gateway (SGW), and a packet gateway (PGW). The MME is responsible for tracking UEs as they roam around the network, thereby managing mobility. The SGW is responsible for routing and forwarding user data packets. The PGW is responsible for providing connectivity to external packet data networks, such as the Internet. Other network nodes may also be part of the core network.

In some embodiments, a cloud coordination server or LTE access controller may be used to provide virtualization of eNodeBs. For example, a network may include a plurality of eNodeBs. In a traditional LTE network, each eNodeB would communicate with the MME independently to handle mobility of the UE, etc. However, when a large number of eNodeBs are connected to a single MME, signaling overhead required for paging (i.e., attempting to contact a UE by messaging one or more eNodeBs) and handovers between eNodeBs is significant. Virtualizing the large number of eNodeBs allows for both paging traffic and handover traffic to be reduced to a significant degree.

LTE connectivity can be provided by a mesh network of eNodeBs. In the case that a mesh network is used to provide LTE connectivity, eNodeBs may be modified to act as relays, thereby providing both access and backhaul for traffic from UEs and also for traffic from other eNodeBs. In some embodiments, a self-organizing network (SON) module located at each eNodeB may provide mesh networking functions. For example, the SON module may monitor links between eNodeBs, may identify a backhaul link for the eNodeB, and may handle the appearance and disappearance of links. In some modules, additional modules may identify appropriate routing paths for traffic passing through the eNodeB.

An exemplary mesh network is described in U.S. patent application Ser. No. 13/889,631, entitled "Heterogeneous Mesh Network and a Multi-RAT Node Used Therein," filed on May 8, 2013, and U.S. patent application Ser. No. 14/211,355, entitled "Methods of Incorporating an Ad Hoc Cellular Network into a Fixed Cellular Network," filed Feb. 18, 2014, both of which are referenced above.

In an exemplary mesh network, the network may allow nodes to be added, subtracted, or moved dynamically. The nodes may coordinate with each other or with a cloud coordination server to ensure that at least one route is available for IP connectivity to each node. Some nodes may be designated as relays only, and may not provide access to mobile devices. Other nodes may provide access to mobile devices while relying on wired or wireless backhaul elsewhere within the mesh network to provide backhaul for the mobile devices attached to the node.

In an exemplary mesh network, the base stations may send and receive control messages relating to the availability and quality of signal among the nodes to coordinate with each other. The base stations may connect with each other as soon as they are within range, in some embodiments. The base stations may dynamically bring links up and tear links down based on factors such as: signal interference; base station location; base station speed/acceleration; availability of backhaul at a given node; load at a given node; number of UEs connected to a particular node; and other factors. The base stations may each incorporate one or multiple radio access technologies.

When a cloud coordination server is present, the cloud coordination server may identify routing paths for packets entering or exiting the network, in some embodiments. In other embodiments, routing paths may be identified by the eNodeBs themselves and distributed among the eNodeBs in the mesh network. In some embodiments, routing paths may be identified at the eNodeB and shared among the eNodeBs, thereby enabling routing without the use of a central server.

The MBMS Protocol

Turning to the multimedia broadcast multicast service (MBMS)/evolved multimedia broadcast multicast service (eMBMS), the MBMS is a point-to-multipoint interface specification for delivering broadcast and multicast services across multiple cells as well as single cells. MBMS has been standardized in UMTS Release 6, and eMBMS has been standardized in LTE Release 9.

Conceptually, MBMS involves a MBMS bearer service, which provides the transport layer for MBMS services, and a MBMS user service, which provides functionality to enable user-facing applications. The MBMS bearer service uses IP multicast to send data to multiple endpoints, and as it uses IP multicast, relies upon intermediary nodes to duplicate IP streams in order to reach all receivers. The MBMS user service enables two methods for data delivery, specifically a streaming delivery method and a download delivery method. Streaming may be used for continuous transmissions like mobile TV, while download may be used for transmitting files. In some embodiments, forward error correction (FEC) may also be used to mitigate errors on the channel without requiring retransmission, which is less desirable with streaming media and live media.

To facilitate eMBMS services, a special channel known as the multicast broadcast single frequency network (MBSFN) is provided in the LTE standard. MBSFN dynamically forms a single-frequency network, which is a network consisting of groups of adjacent base stations that send the same signal simultaneously on the same frequency sub-carriers. MBSFN uses LTE's downlink modulation and multiple access schemes to allow transmission without interfering with other base stations, including other base stations transmitting the same IP stream using MBMS. Within a single MBSFN area, all cells contribute to a MBSFN transmission, creating a transmission of identical waveforms at the same time from multiple cells that is seen as a single transmission by a UE, and that is capable of significant improvements in spectral efficiency and bandwidth. To achieve this goal, all cells are therefore synchronized and controlled within the MBSFN area.

The eMBMS standard also involves additional network nodes to facilitate eMBMS services. The broadcast multicast service center (BM-SC) connects to the content provider, and provides membership, session and transmission, proxy and transport, service announcement, security, and content synchronization. The eMBMS gateway distributes MBMS user plane data to a plurality of eNodeBs using IP multicast, duplicating IP streams as needed. The eMBMS gateway also performs MBMS session control signaling towards the EUTRAN via the MME. The multicast coordination entity (MCE), in conjunction with the eNodeB and the MME, provides admission control, radio resource control, and decides the modulating and coding scheme.

Multipath Delivery

It is desirable to provide eMBMS services in conjunction with a mesh network. For example, a mesh network may provide flexibility, resiliency and speed for first responders, such as a fire rescue squad. The mesh network may be enhanced by adding the capability to stream live video of the inside of a burning building, for example, to each handset connected to the network.

When eMBMS is introduced into a mesh network, however, various complications arise. Firstly, IP multicast transport is disrupted because mesh networks, which may be deployed in configurations that have limited backhaul capabilities, may have insufficient bandwidth to receive multiple copies of a single IP multicast stream. Secondly, IP multicast transport is also disrupted because the number of multicast streams is determined within the core network, but the mesh network may decide to add or remove nodes independently of the core network, leading to an inability of the eMBMS gateway to create the appropriate streams. Thirdly, IP multicast by itself does not account for the dynamically changing characteristics of mesh network links, which may lead to streams with high latency and dropped connections.

The problems described above are compounded when using a cloud coordination server that virtualizes eNodeBs. When a cloud coordination server operates to hide individual eNodeBs from the core network, the eMBMS gateway becomes unable to duplicate streams for individual eNodeBs and unable to assign routes for streams without information about routes to each node, and the only way to provide multicast services becomes to broadcast the desired multimedia data to all eNodeBs in the network. The MCE becomes unable to coordinate and synchronize radio configurations and radio resources in order to send the same transmission from each eNodeB in the MBSFN area. Additionally, the BM-SC becomes unable to perform content synchronization using the SYNC protocol, as the BM-SC is not able to communicate directly with the eNodeBs. Additionally, when individual eNodeBs replicate packets on their own for IP multicast, multiple acknowledgements may be returned to the eNodeBs, which may adversely affect the capacity of the network. Additionally, the MCE is not able to properly perform allocation of eMBMS radio resources.

The Cloud Coordination Server

The following describes how a cloud coordination server may be enabled to address these problems.

A cloud coordination server, as mentioned elsewhere herein, may be a network node in the data path between the core network and the radio access network, and may provide virtualization of the core network to the RAN, and virtualization of the RAN to the core network, by hiding identifiers for individual network nodes and routing requests as necessary to the appropriate network node. The cloud coordination server may include a routing processor, a sync processor, a store and forward processor, and/or other processors. One or more general purpose processors may be used to perform any or all of the functions described herein.

The cloud coordination server may be configured to operate with a mesh RAN. The cloud coordination server may be configured to receive MBMS streams from the core network and to send those streams into the mesh RAN. The cloud coordination server may also be configured to receive signal measurement reports from the mesh RAN, store those reports, and process them to determine optimal routing and quality of service. The cloud coordination server may receive these reports at intervals, which may be once every millisecond or once every transport time interval (TTI), in some embodiments.

Importantly, the cloud coordination server may be configured to perform one or more functions that are performed by one or more of the BM-SC, eMBMS gateway, and MCE, or may be configured to pass requests to these counterpart servers in the core network. The cloud coordination server may coordinate a connected RAN as a single multi-broadcast single frequency network (MBSFN) domain, in some embodiments.

For example, the cloud coordination server may specifically be enabled to perform the functions of a multicell/multicast coordination entity (MCE). The MCE performs allocation of time/frequency radio resources used by eNodeBs within the MBSFN area, ensuring that the same resource blocks are used within the area for a given service. The MCE also sets the radio configuration modulation and coding scheme. However, as the MCE is within the core network and does not have access to the individual addresses of the eNodeBs, in some embodiments, the cloud coordination server may take over its functions, as described below.

The cloud coordination server plays an important role in providing virtualization of eNodeBs and other resources in the radio access network. As described in U.S. patent application Ser. No. 14/034,915, "Dynamic Multi-Access Wireless Virtualization," the cloud coordination server presents an interface of a single eNodeB to the MME, while relaying relevant messages from the MME to each of a plurality of eNodeBs, thus providing virtualization of the radio access network. Many advantages are attained thereby, such as reduced resource usage at the MME and increased flexibility for the network operator in reconfiguring the radio access network. A similar capability may be provided for eNodeBs that need to communicate with eMBMS network nodes, such as the MCE and the BM-SC.

For example, the cloud coordination server may perform virtualization of functions performed by the MCE. Specifically, the MCE is responsible in the LTE standard version of eMBMS for providing radio resource control to all eNodeBs on the MBSFN. However, by allowing this function to be provided by the cloud coordination server, the RAN may be made more easily reconfigurable, which is complementary with the mode of operation of a mesh network.

As another example, the BM-SC is responsible for performing, in part, functions that relate to authorizing specific eNodeBs to receive and retransmit content. When these functions are performed instead by the cloud coordination server, the cloud coordination server may authorize a variable number of eNodeBs to retransmit the content, even if the number of eNodeBs that are allowed to transmit the content changes, while allowing an BM-SC, if present, to authorize only the cloud coordination server acting as a single eNodeB.

As another example, the cloud coordination server may perform synchronization functions typically performed by the MCE and/or BM-SC (or other nodes) within the MBSFN area. The cloud coordination server may determine the start time of the synchronization sequence for the MBSFN. The cloud coordination server may send out synchronization protocol data unit (SYNC PDU) packets containing the start time to each eNodeB, a function that would typically be performed by the BM-SC. The cloud coordination server may also provide the configuration of the sync period to the MBSFN. The MCE and/or BM-SC will not need to perform these functions.

In some embodiments, sync may be additionally enabled by each base station reporting a system frame number and sub-frame ID to the cloud coordination server. The base station may report these identifiers once every transport time interval (TTI), in some embodiments. Based on the time of receipt of each of these timing messages, the cloud coordination server may calculate system frame number and sub-frame ID offsets for each of the nodes. These offsets may be used in conjunction with information about the mesh network topology and individual links within the mesh to further fine-tune the synchronization offsets.

Additional optimizations are made possible by the centralization of various functions at the cloud coordination server. For example, in some embodiments, the cloud coordination server provides functions typically performed by the MCE and by the MME. In many cases, communications can be performed between an MCE logical module and an MME logical module on the cloud coordination server, or data may be exchanged without an explicit M3 protocol message between the two logical modules, or data may be exchanged within a single module when the two functions are implemented using the same logical module or logical process. Further optimizations of this nature have been considered and appreciated as well.

Various architectures may also be used to provide the advantages described above. For example, the cloud coordination server may be used to provide virtualization of eNodeBs in the radio access network simply by adding it to a network configured according to the standard 3GPP eMBMS architecture. Without otherwise reconfiguring the MCE and BM-SC, the cloud coordination server may provide the advantages of virtualization by presenting itself as a single eNodeB to the MCE and BM-SC. As another example, the MCE may be taken out of the network, and/or the BM-SC may be taken out of the network, and the cloud coordination server may perform all of the functions that would otherwise have been performed by the removed eMBMS network nodes.

Use of Mesh Topology and Link Quality to Create MBMS Data Plane Routing

In some embodiments, the cloud coordination server is also enabled to receive reports from the eNodeBs about signal strength and link quality. These reports may include forwarded UE measurement reports, eNodeB SON reports, eNodeB neighbor reports, or other reports. In some embodiments, data structures may be maintained at the cloud coordination server to keep track of the current state of the links in the mesh network, including up/down status, current signal to interference and noise ratio (SINR), and other status information. In some embodiments, the link information may be used to calculate an appropriate route for each multicast stream of traffic. In some embodiments, a multichannel multi-interface (MCMI) algorithm may be used to determine the appropriate route.

Monitoring Interference from Environment and Use of 'Safe' Resources

In some embodiments, a cloud coordination server actively monitors the status and environmental conditions of network links in the mesh network. This enables the cloud coordination server to predict, for example, when links are fading or if they are subject to periodic disruptions. The cloud coordination server may, in some embodiments, incorporate predictive assessments of link quality in determining a routing for MBMS traffic. In some embodiments, only links or nodes are used that have been identified as stable and high-quality.

In an alternate embodiment, a cloud coordination server may review the nodes that are receiving an MBMS transmission and may determine that a particular node is slowing down the other nodes by, e.g., failing to respond with acknowledgement packets. The cloud coordination server may cause the slow node to be dropped from the list of MBMS recipients. The cloud coordination server may also cause the slow node to increase its transmit power, which may potentially improve the performance of the slow node, as well as that of the rest of the network. The cloud coordination server may also identify the source of any interference that the slow node is subject to, and address that interference, by, for example, instructing another mesh node to reduce transmission power.

In some embodiments, a neighboring multicast/broadcast single frequency network (MBSFN) may be detected by a UE or base station, in some embodiments. In these cases, an inter-symbol interference value may be determined by the cloud coordination server, based on the frequency of the neighboring MBSFN, the location thereof, the reference power thereof, or other factors. In some embodiments, appropriate interference mitigation techniques may be used. In some embodiments, the cloud coordination server may select a different radio resource for its own MBSFN. In some embodiments, the cloud coordination server may communicate with another server to request a reduction in power of the neighboring MBSFN.

Subset of Nodes for Providing MBMS; Reserve List

In some embodiments, a reserve list is used to enable delivery of MBMS data over a mesh network. At the cloud coordination server, each of the eNodeBs is known, together with the links between them. In some embodiments, the cloud coordination server may be configured with a minimum mesh node link quality threshold. When the cloud coordination server calculates a route for MBMS traffic, the quality of each link in the mesh network may be compared to the quality threshold. If the link quality does not exceed the configured quality threshold, that link may be excluded from the route calculation. A reserve list may be created for nodes that are underperforming, based on the factors above, and/or UE signal measurements, UE location, cell loading, cell utilization, and/or other parameters. The nodes on the reserve list can be excluded and a route or route tree may be created for the MBMS data stream. In the case that a node is added to a reserve list, the UEs attached to that node may be redirected to other nodes that are part of the MBMS stream route, in some embodiments.

In some embodiments, the same mechanism may be used to exclude entire mesh nodes from the route calculation. In some embodiments, mesh nodes with inferior quality links may be excluded from the route calculation when the link quality is below the threshold, except where the topology of the mesh network requires that a mesh node with inferior quality links be present in the routing (i.e., when the specific mesh node is required to be part of every route to the destination node).

Store-and-Forward

In some embodiments, multicast data streams may be stored upon receipt, either at the coordination server or at one or more mesh network nodes. The stored streams may then be forwarded/retransmitted according to the multipath routing. When forwarded, the streams may be sent at a different speed than was initially transmitted. The initial storage results in a time lag, and transmission at a slower speed than initially transmitted may also cause another time lag, but may allow for the stream to be smoothly transmitted across the mesh network without dropped packets to all recipients. In the case that certain network links have higher latencies, or in the case that one portion of the network is bottlenecked via a slow link, this "store and forward" technique may be used to increase reliability on poor-quality network links.

In some situations, mesh network links may have poor reliability or high error rate. In these cases, a forward error correction code (FEC code) may be applied to compensate for the high error rate, but will result in a decreased data rate. In some embodiments, a store and forward technique as described above may be used in conjunction with a particular FEC code to provide more-reliable streaming performance over one or more lower-data rate links, at the cost of introducing a buffering delay into the multicast distribution stream.

In some embodiments, the store-and-forward method may make use of anchor nodes, i.e., nodes within the network that are being used to buffer and retransmit data. In some embodiments, more than one anchor may be used. Anchors may be selected based on favorable backhaul link conditions, in some embodiments. In some embodiments, multicast coordination may be handled partially or wholly by the anchor nodes, working in conjunction with one another.

In some embodiments, in the case that various links have different link speed or link quality, transmission may be delayed on one or more links to provide higher quality and/or to provide greater synchronization. Coordination of radio resources may be done at the cloud coordination server, and may include specifying individual delays for individual mesh network nodes based on individual link quality within the radio access network.

In some embodiments, the store-and-forward method may be used if the network transmission rate falls below the LTE multicast requirement of 2 MBps on modulation.

Prioritization on Wi-Fi or Mesh Backhaul

In some embodiments, MBMS traffic may be sent over Wi-Fi backhaul. When it is sent over Wi-Fi or other backhaul links, MBMS traffic may be prioritized. Prioritizing traffic may be useful because MBMS traffic tends to be streaming media, which is sensitive to brief interruptions in service and requires a constant data rate in order to smoothly deliver audio and/or video content. Prioritization of traffic may be enabled by adjusting backhaul parameters within the mesh network described herein.

Specifically, one or more mesh network nodes may use Wi-Fi for backhaul. TCP/IP traffic shaping and other generally-known techniques may be used for prioritizing MBMS content that is transmitted over a Wi-Fi backhaul connection. In some embodiments, Wi-Fi Multimedia Extensions (WME) or Wi-Fi Multimedia (WMM) quality of service may be used, according to the 802.11e specification, which is hereby incorporated herein in its entirety. WMM supports both a voice priority tier and a video priority tier; in some embodiments, either or both may be used.

In another Wi-Fi backhaul embodiment, interframe spaces may be used to enable quality of service and priority for MBMS streams. For example, point (coordination function) interframe space (PIFS), which is part of the 802.11a, b, g, n, and ac standards, may be used on a Wi-Fi backhaul link between a mesh node and a Wi-Fi backhaul node to ensure quality of service. When an access point being used for Wi-Fi backhaul and the mesh node enable PIFS, the mesh node may wait for access and the access point may have the ability to access the channel during a PIFS time slot. The access point may then use the PIFS time slot to transmit MBMS data, some embodiments. The coordination server may help coordinate the PIFS priority mechanism, in some embodiments.

Other mechanisms may be used to provide priority features, in some embodiments. In some embodiments, time division multiplexing (TDM) may be used over the mesh network, and TDM may be used to provide priority features. Additionally, a mapping table may be used to assign priorities to individual streams, streams directed toward specific mesh nodes, streams directed toward specific UEs, or another subset of MBMS streams. In some embodiments, the multicast data may be encapsulated in unicast packets, with identifiers being used to mark the unicast packets as higher priority.

In an alternate embodiment using a time division multiplexing (TDM)-based transport protocol, two multi-RAT nodes, in conjunction with a cloud coordination server, may parse a data transmission into two segments to be transmitted to one or more UEs. In this embodiment, it is possible to change the contention window so that one portion of the data arrives at the UE before the other portion of the data. Using a TDM-based transport protocol, it may be possible in some embodiments to assign an MBMS stream to a particular time slot and to thereby guarantee a minimum level of quality of service.

In some embodiments, time-slotted transmissions by the cloud coordination server are used to request priority treatment from an eNodeB in the radio access network. In other embodiments, priority may be individually requested by one or more eNodeBs, and priority may be granted by the cloud coordination server. In some embodiments, priority may be individually requested using a hash algorithm distributed among the requestors, and sending the hash along with an identifier to the cloud coordination server. In some embodiments, if one data stream, which may be a multicast data stream, requires priority, transmit power of non-participating nodes may be reduced in order to reduce interference and improve link quality.

Throughput Versus Reliability

In some embodiments, a service may be analyzed using a throughput versus reliability analysis. Specifically, there may be particular users or types of data where reliability of transmission and reception is more important than throughput. For example, in public safety applications, reliability may be more important, but for a live event, throughput may be more important. In this embodiment, header markings may be added to the MBMS data to indicate whether reliability is more important than throughput and vice versa.

A detailed description of embodiments, in conjunction with a description of the figures, follows.

DETAILED DESCRIPTION OF FIGURES

FIG. 1 is a schematic diagram of a network providing MBMS services. Content provider 102 is a data source, such as a streaming video server or live television reflector server, which is connected to broadcast multicast service center (BMSC) 104. BMSC 104 receives content from the content provider 102 and transmits it to MBMS gateway 106. BMSC 104 also performs other functions, including membership, session and transmission, proxy and transport, service announcement, security, and content synchronization.

MBMS gateway 106 is in communication with mobility management entity (MME) 108, and via MME 108, with multicast coordination entity (MCE) 110. MBMS gateway 106 performs MBMS session control signaling via MME 108 and MCE 110. MBMS gateway 106 also is responsible for forwarding data streams from BMSC 104 directly to eNodeBs 112, 114, 116.

MCE 110 is responsible for radio resource control of eNodeBs 112, 114, 116. MCE 110 directly communicates with eNodeBs 112, 114, 116. The eNodeBs 112, 114, 116 provide access to UEs 118, 120, 122, and forward MBMS data to those attached UEs. Not shown are S1 protocol connections between eNodeBs 112, 114, and 116 and MME 108. The eNodeBs 112, 114, 116 are not directly in communication with each other for forwarding or routing MBMS user plane data.

Figure 2:
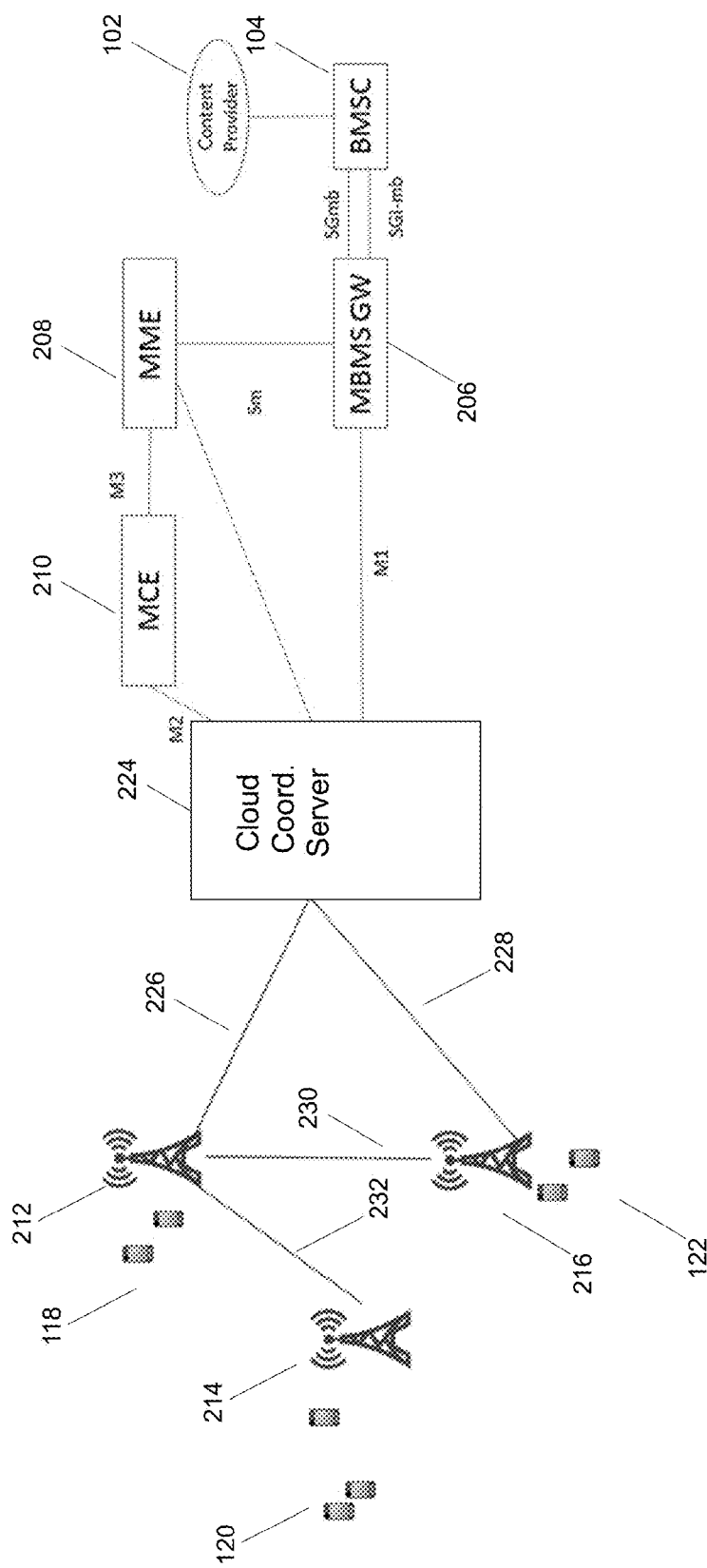
FIG. 2 is a schematic diagram of a network providing MBMS services via a mesh network, in accordance with some embodiments.

FIG. 2 is a schematic diagram of a network providing MBMS services via a mesh network, in accordance with some embodiments. Each of content provider 102, BMSC 104, MBMS gateway 206, MME 208, MCE 210, eNodeBs 212, 214, and 216, and UEs 118, 120, and 122 retain the same functions as performed by their counterparts in FIG. 1.

MBMS gateway 206, MME 208, MCE 210, and eNodeBs 212, 214, and 216 perform various additional functions as described below.

Also appearing in FIG. 2 is cloud coordination server 224. Cloud coordination server 224 is coupled to MCE 210 and MBMS gateway 206. Cloud coordination server 224 is also coupled to MME 208. Cloud coordination server 224 provides virtualization of eNodeBs 212, 214, 216, and mediates communication between these eNodeBs and MCE 210, MBMS gateway 206, and MME 208. Cloud coordination server 224 may, in some embodiments, prevent MCE 210, MBMS gateway 206, and MME 208 from being able to individually identify the eNodeBs. Cloud coordination server 224 may also, in some embodiments, prevent eNodeBs 212, 214, 216 from communicating directly with MCE 210, MBMS gateway 206, and MME 208. In order to provide the same functions to the attached mobile devices, cloud coordination server 224 may take over the functions of MCE 210, MBMS gateway 206, and MME 208, and may present itself to MCE 210, MBMS gateway 206, and MME 208 as a single eNodeB. Cloud coordination server 224 may receive link status reports from eNodeBs 212, 214, 216 and may use these to perform coordination of the mesh network, as well as to perform MBMS coordination functions.

The eNodeBs 212, 214, 216 are arranged in a mesh network. The mesh network includes links 226, 228, 230, and 232, but does not include a link between eNodeB 214 and eNodeB 216. The eNodeBs 212, 214, 216 may be mobile mesh network nodes, and may continuously monitor the status of links between each of the nodes in the network and with the cloud coordination server 224. Links 226 and 228 may both be available for use as backhaul by all of the nodes in the network, including eNodeB 214, and eNodeBs 212 and 216 may permit eNodeB 214 to use links 226 and 228 for backhaul by providing routing and transit services to eNodeB 214. The eNodeBs 212, 214, 216 may comprise a MBSFN.

Cloud coordination server 224 may be enabled to provide virtualization capability even when integrated directly into the core network architecture specified by the 3GPP LTE eMBMS standard, without modification made to any nodes already present in the core network. The virtualization reduces messaging required in the network. For example, the 3GPP LTE eMBMS standard specifies that each eNodeB have a M1 link to the MCE. In FIG. 2, cloud coordination server 224 may receive all M1 communications from all eNodeBs, and may aggregate M1 and M2 communications from the eNodeBs 212, 214, and 216, and may act as a relay for these aggregated M1 and M2 communications into the core network. Cloud communication server 224 may relay M2 communications to an MCE node 210, and may aggregate and relay M1 communications to an MBMS gateway node 206, as shown, for all eNodeBs on the radio access network. This eliminates the necessity for individual M1 links between eNodeBs and the MCE.

Specifically, as MCE 210 and MBMS gateway 206 are designed to operate with communications with specific eNodeBs, when communications are received from any of eNodeBs 212, 214, 216, cloud communication server 224 may aggregate all received M1 and M2 signals, rewrite the M1 and M2 signals such that MCE 210 and MBMS gateway 206 interpret all signals as coming from a single eNodeB, and relay the signals along. Similarly, any signals received from MCE 210 and MBMS gateway 206 may be received by cloud communication server 224, analyzed, rewritten to indicate to which eNodeB the signal is intended, and relayed along to the appropriate eNodeB.

In the specific case of the radio resource control functionality of the MCE, the MCE 210 may not be optimally located to provide control over the radio resources of the eNodeBs. This function may be performed at the cloud coordination server.

Cloud coordination server 224 may maintain tables, caches, queues, or database entries that record which communications came from which nodes, and may use preexisting identifiers embedded in the messages to distinguish the messages, or may add identifiers for this purpose. Cloud coordination server 224 may also retain information about active tunnels, bearers, ports, or request-response pairs in order to more accurately match and de-aggregate communications from the MCE and MBMS gateway. In cases that messages are sent that would be appropriate for multiple eNodeBs, such as a radio resource setting for a MBSFN, or broadcast data streams meant for multiple eNodeBs, the messages may be duplicated as needed and forwarded to more than one eNodeB.

In some embodiments, instead of representing itself as a single eNodeB, the cloud coordination server may represent itself as two eNodeBs. This may be useful in the case of eMBMS, which expects that a plurality of eNodeBs will be available to make up a single MBSFN.

In some embodiments, when link 232 is degraded beyond a certain quality threshold, the cloud coordination server 224 may place eNodeB 214 on a reserve list, may remove eNodeB from the MBSFN, and may use eNodeBs 212 and 216 to transmit MBMS data to mobile devices in the coverage area. In some embodiments, cloud coordination server 224 may cause the transmission power of eNodeBs 212 and 216 to be increased and the transmission power of eNodeB 214 to be decreased, to provide greater coverage to mobile devices 220 in the coverage area of eNodeB 214. In some embodiments, cloud coordination server 224 may cause store-and-forward operation to be initiated, with the data being stored at, and forwarded from, one of eNodeB 212 and eNodeB 214.

Figure 3:
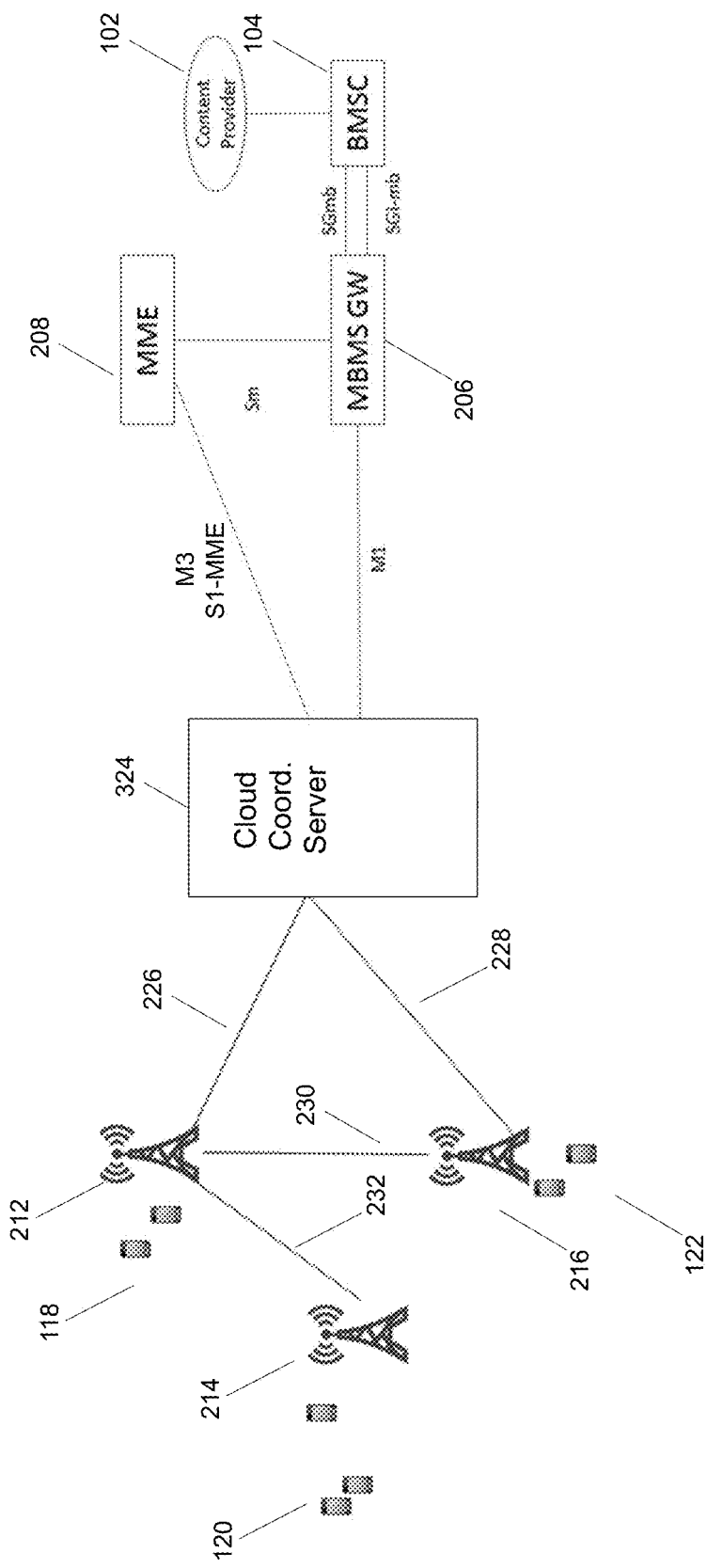
FIG. 3 is a schematic diagram of an alternative network providing MBMS services via a mesh network, in accordance with some embodiments.

FIG. 3 is a schematic diagram of an alternative network providing MBMS services via a mesh network, in accordance with some embodiments. Each of content provider 102, BMSC 104, MBMS gateway 206, MME 208, eNodeBs 212, 214, and 216, and UEs 118, 120, and 122 retain the same functions as performed by their counterparts in FIGS. 1 and 2. MCE 210 is subsumed into cloud coordination server 324.

Recall that MCE 210 is responsible for admission control, allocation of time and frequency radio resources, radio configuration and modulation and coding configuration. MCE 210 communicates with eNodeBs to perform these functions. In some cases, the LTE and eMBMS standards permit the functions of the MCE to be divided among the eNodeBs themselves. In FIG. 3, these functions are no longer handled by MCE 210, which is no longer needed, and the functions are handled directly by cloud coordination server 324.

In order for the cloud coordination server to handle the functions of MCE 210, it must represent itself as an MCE to the MME 208. FIG. 3 consequently shows M3 communications between MME 208 and cloud coordination server 324, as the M3 protocol is used between the MME 208 and an MCE in the eMBMS portion of the LTE standard. No M2 communications between the MCE and the cloud coordination server are shown because they are transmitted internal to the cloud coordination server, and may use a protocol different than the M2 protocol. The cloud coordination server also still represents itself as an eNodeB to the MME 208, and has multiple software or hardware modules that provide the required external protocol interfaces to the MME and to other network nodes. The cloud coordination server may duplicate messages as needed to act as a relay for all eNodeBs in the radio access network.

Figure 4:
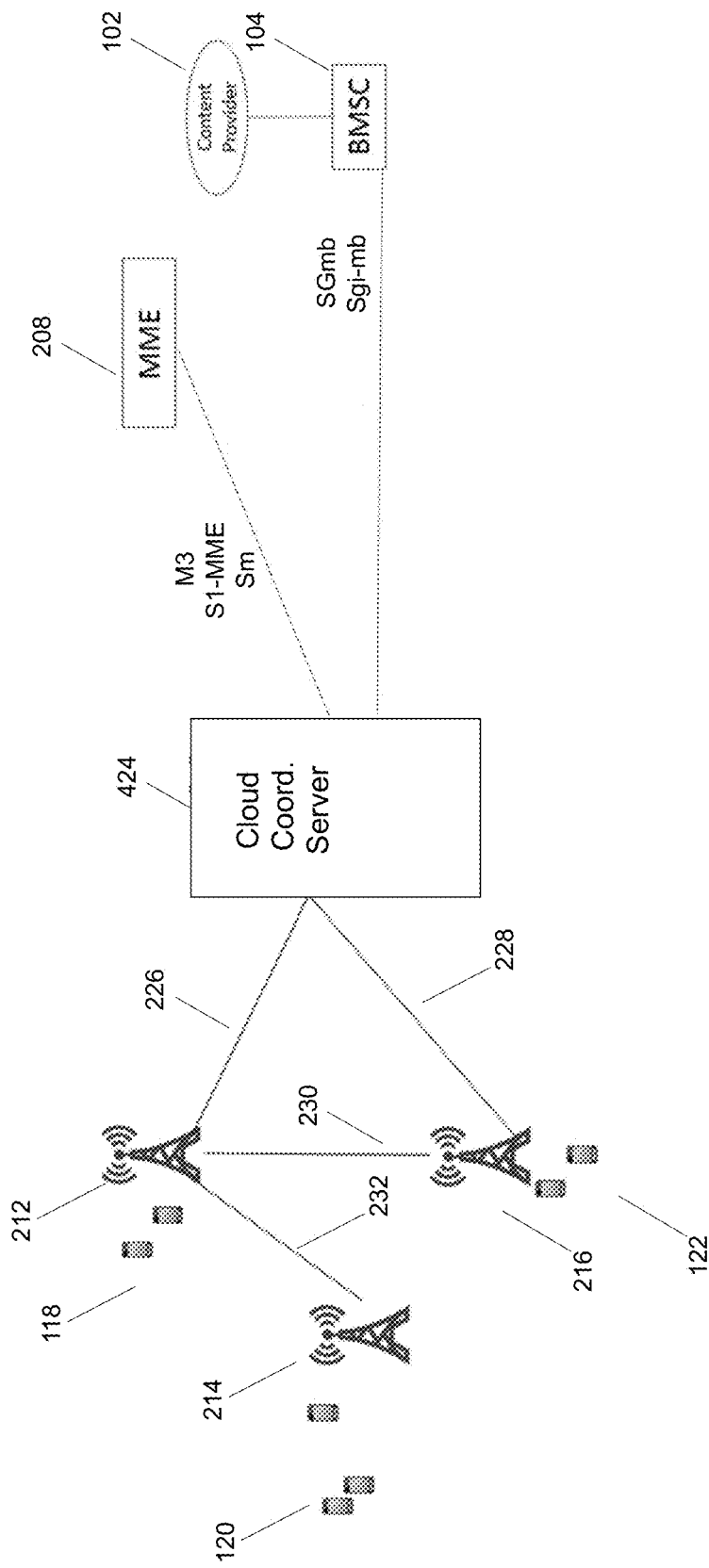
FIG. 4 is a schematic diagram of an alternative network providing MBMS services via a mesh network, in accordance with some embodiments.

FIG. 4 is a schematic diagram of an alternative network providing MBMS services via a mesh network, in accordance with some embodiments. Each of content provider 102, BMSC 104, MME 208, eNodeBs 212, 214, and 216, and UEs 118, 120, and 122 retain the same functions as performed by their counterparts in FIGS. 1 and 2. MCE 210 is integrated into cloud coordination server 424, as described above with reference to FIG. 3. Additionally, MBMS gateway 206 is also integrated into cloud coordination server 424.

MME 208 is shown corresponding with cloud coordination server 424 via the S1-MME protocol. This is because the cloud coordination server takes on the function of all eNodeBs that are located on the other side of the cloud coordination server 424, and the cloud coordination server 424 uses the S1-MME protocol as ordinarily used between MMEs and eNodeBs in the LTE standard.

MME 208 is also shown corresponding with cloud coordination server 424 via the Sm protocol. This is because Sm protocol is used between an MME and an MBMS gateway in the eMBMS portion of the LTE standard. Similarly, BMSC 104 is shown corresponding with cloud coordination server 424 using the SGmb and SGi-mb protocols, which are the protocols used between a BMSC and an MBMS gateway in the eMBMS portion of the LTE standard. As described above, the cloud coordination server represents itself as an MBMS gateway to the BMSC in order to perform the functions required, but duplicates messages as needed to act as a relay for all eNodeBs in the radio access network.

Not shown in FIGS. 1-4 are other core network nodes used in various wireless protocol core networks, such as the SGW and PGW used in an LTE network, as well as other network nodes, such as SGSNs, GGSNs, PDSNs, and other network nodes for compatibility with UMTS, CDMA, and other wireless network standards. In some embodiments, although a figure is not provided, the functions of the MME may also be integrated into the cloud coordination server.

Figure 5:
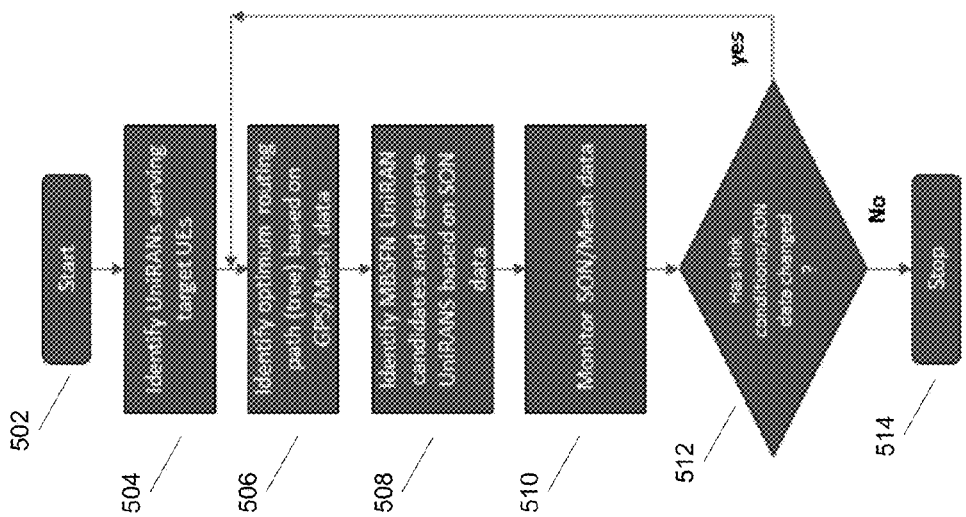
FIG. 5 is a flowchart depicting a method for providing MBMS services via a mesh network, in accordance with some embodiments.

FIG. 5 is a flowchart depicting a method for providing MBMS services via a mesh network, in accordance with some embodiments. The method shown may be performed at a cloud coordination server 224, or it may be performed, in whole or in part, at one or more mesh network nodes, such as eNodeBs 212, 214, and 216. When performing a portion of the method, the eNodeBs 212, 214, 216 may communicate with the cloud coordination server 224 to provide a partial computation in a message. Certain steps shown in FIG. 5 refer to UEs, which are UMTS or LTE-compliant user equipments, in some embodiments. Certain steps shown in FIG. 5 refer to UniRANs, which are base stations and/or eNodeBs within the radio access network, in some embodiments. Other embodiments are contemplated that include other types of mobile devices and/or other types of base stations.

At step 502, operation begins. At this step, a MBMS data stream has been requested to be served to identified mobile devices. At step 504, one or more eNodeBs or base stations are identified that serve the identified mobile devices. At step 506, an optimum routing path is determined. The optimum routing path may be a tree, in some embodiments, with multiple leaves. Multiple leaves are possible because in an MBSFN, multiple base stations may be used to reach a single mobile device. The optimum routing path may be a routing path that reaches all identified mobile devices, but does not need to be the single best routing path under all circumstances. The optimum routing path may take into account mesh network node data, including GPS location of mesh network nodes, link quality, and other factors, as described elsewhere herein. The optimum routing path may take into account a reserve list, and may not necessarily use all base stations in the network.

At step 508, once the optimum routing path is determined, the specific base stations needed to be used to deliver the MBMS data stream are identified, and messages are sent to each base station to establish the MBSFN, if not already established, and to set up the MBMS data stream. This step may include setting up radio resources and modulation schemes, as performed by a multicast coordination entity (MCE) in the MBMS standard.

At step 510, continuous monitoring of status data begins. The status data being monitored includes link data, such as received signal strength indication (RSSIs), reference signal received power (RSRP), or other parameters. In the case that a non-LTE network link is part of the mesh network, such as a Wi-Fi link, other status data may also be used. For example, a received channel power indicator (RCPI) may be used in Wi-Fi contexts. In addition, other parameters may be monitored, such as load at a particular mesh node, the number of UEs attached at a particular mesh node, other data requirements at each of the mesh nodes, other MBMS data streams being delivered over the same channel or over channels served by the base station, or other parameters. Other parameters may also be reviewed, such as parameters being used by a self-organizing network (SON) module to determine whether to activate links or deactivate links, whether to increase power or decrease power, or other parameters.

At step 512, the received link conditions are checked to see if they have changed since the last check. If a change has occurred, the route should be reevaluated, and operation consequently is returned to step 506. If no change has occurred, operation proceeds to step 514, and ends. Operation will be triggered again at a particular interval based on a crontab, or other asynchronous operation triggering mechanism. In some embodiments, the particular interval may be on the order of a single transport time interval (TTI), or on the order of 10 TTIs, or on the order of minutes. In some embodiments, operation will be triggered only while an MBMS data flow is active.

Figure 6:
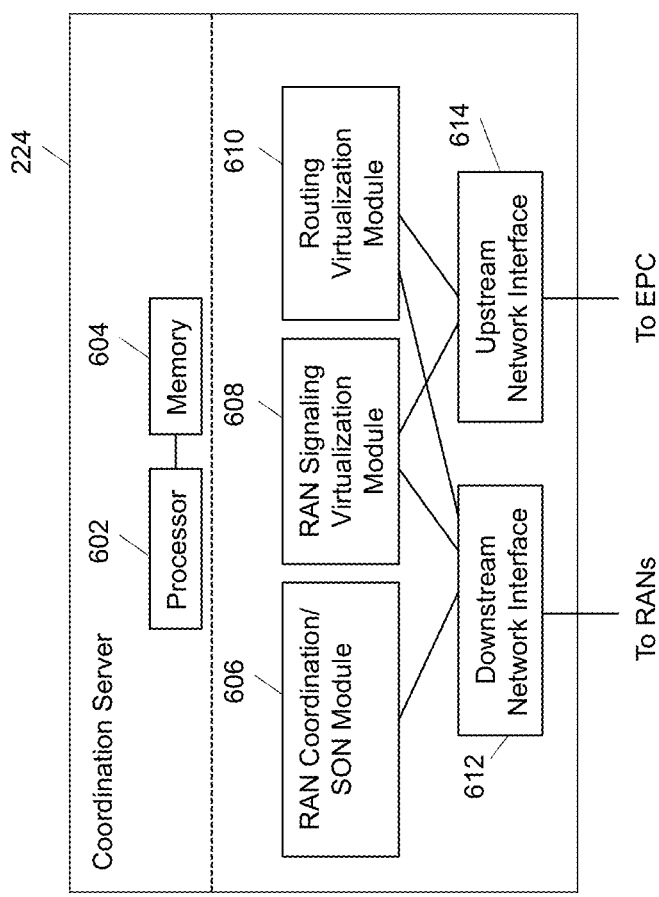
FIG. 6 is a block diagram of an exemplary device for performing a power adjustment method, in accordance with some embodiments.

FIG. 6 is a block diagram of an exemplary device for performing a power adjustment method, in accordance with some embodiments. The cloud coordination server 224 described in FIG. 2 is shown in greater detail. Coordination server 224 includes processor 602 and memory 604, which are configured to provide the functions described herein. Also present are radio access network coordination/self-organized network (RAN Coordination and SON) module 606, RAN signaling virtualization module 608, and routing virtualization module 610. In some embodiments, coordination server 224 may coordinate multiple RANs using coordination module 606. In some embodiments, coordination server may also provide routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Alternatives

Various alternative embodiments are also contemplated by the inventors. For example, certain functions may be performed at an eNodeB, or at a multi-radio access technology node (multi-RAT) node, instead of at a cloud coordination server. The cloud coordination server may be known as a LTE access controller. The functions of the cloud coordination server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the cloud coordination server, within a function performing radio resource allocation and coding selection, or at another location. In some embodiments, a cloud coordination server may identify and initiate power adjustments to improve channel quality.

In some embodiments, the mesh network nodes may provide complete or partial guesses at what paths are the optimal or best paths during a particular time interval, and may be enabled to send messages back to the cloud coordination server to communicate these complete or partial guesses.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A system for providing multicast services to mobile devices, comprising:
   a first network node providing a radio access network to a mobile device;
   a second network node coupled to the first network node and providing backhaul routing for the first network node; and
   a controller node, coupled to both the first and the second network nodes and to a multicast packet gateway,
   wherein the controller node provides a virtualized interface of a single network node to the multicast packet gateway by hiding identifiers for the first network node and the second network node, thereby virtualizing the first and second network nodes to the multicast packet gateway such that the multicast packet gateway is enabled to send a multicast data stream to the first and the second network nodes via the controller node,
   wherein the controller node performs functions of a broadcast multicast service center (BM-SC) and a multicast coordination entity (MCE), according to an evolved multimedia broadcast multicast services (eMBMS) standard, and
   wherein the multicast packet gateway is an evolved multimedia broadcast multicast services (eMBMS) gateway.

2. The system of claim 1, wherein the controller node is configured to receive link quality indication messages from the first and the second network nodes.

3. The system of claim 2, wherein the controller node is configured to construct a multicast route at the controller node based on the link quality indication messages.

4. The system of claim 3, wherein the controller node is configured to send the multicast route to the first and the second network nodes.

5. The system of claim 1, wherein the controller node is configured to select a radio resource to be shared by the first and the second network nodes.

6. The system of claim 1, further comprising a plurality of mesh network nodes, wherein the first and the second network nodes are mesh network nodes.

7. The system of claim 1, wherein the controller node performs radio resource control for enabling the first and the second network nodes to form a single frequency network.

8. The system of claim 1, wherein the first and the second network nodes are intermittently coupled to each other via an intermediate mesh network node.

9. The system of claim 1, wherein the first and the second network nodes are eNodeBs.

10. The system of claim 1, wherein the controller node presents a single interface to the multipath packet gateway.

11. A multicast network control node, comprising:
    at least one memory;
    at least one processor coupled to the at least one memory; and
    at least one network interface, coupled to the at least one memory and to both a first radio access base station and a second radio access base station and to a multicast packet gateway,
    wherein the at least one processor performs steps including:
    providing a virtualized interface of a single network node to the multicast packet gateway by hiding identifiers for the first radio access base station and the second radio access base station, thereby virtualizing the first radio access base station and second radio access base station to the multicast packet gateway such that the multicast packet gateway is enabled to send a multicast data stream to the first and the second radio access base stations via the multicast network control node, and
    performing functions of a broadcast multicast service center (BM-SC) and a multicast coordination entity (MCE), according to an evolved multimedia broadcast multicast services (eMBMS) standard,
    wherein the multicast packet gateway is an evolved multimedia broadcast multicast services (eMBMS) gateway.

* * * * *